W. ZAUGG.
GATE OPERATING MECHANISM FOR WATER WHEELS.
APPLICATION FILED APR. 16, 1920.
1,388,686.
Patented Aug. 23, 1921.
2 SHEETS—SHEET 1.
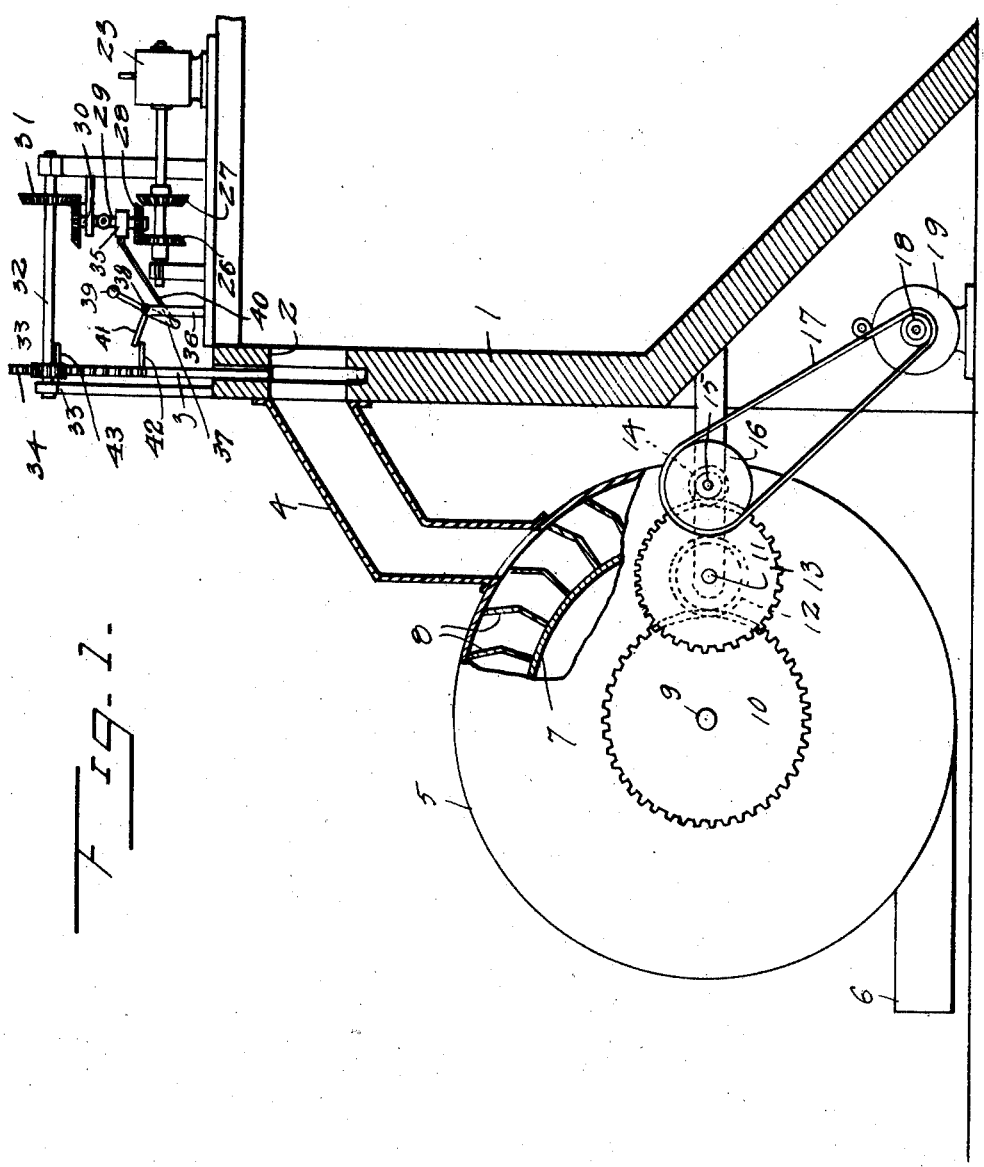
INVENTOR.
Wm. Zaugg
BY
ATTORNEY.

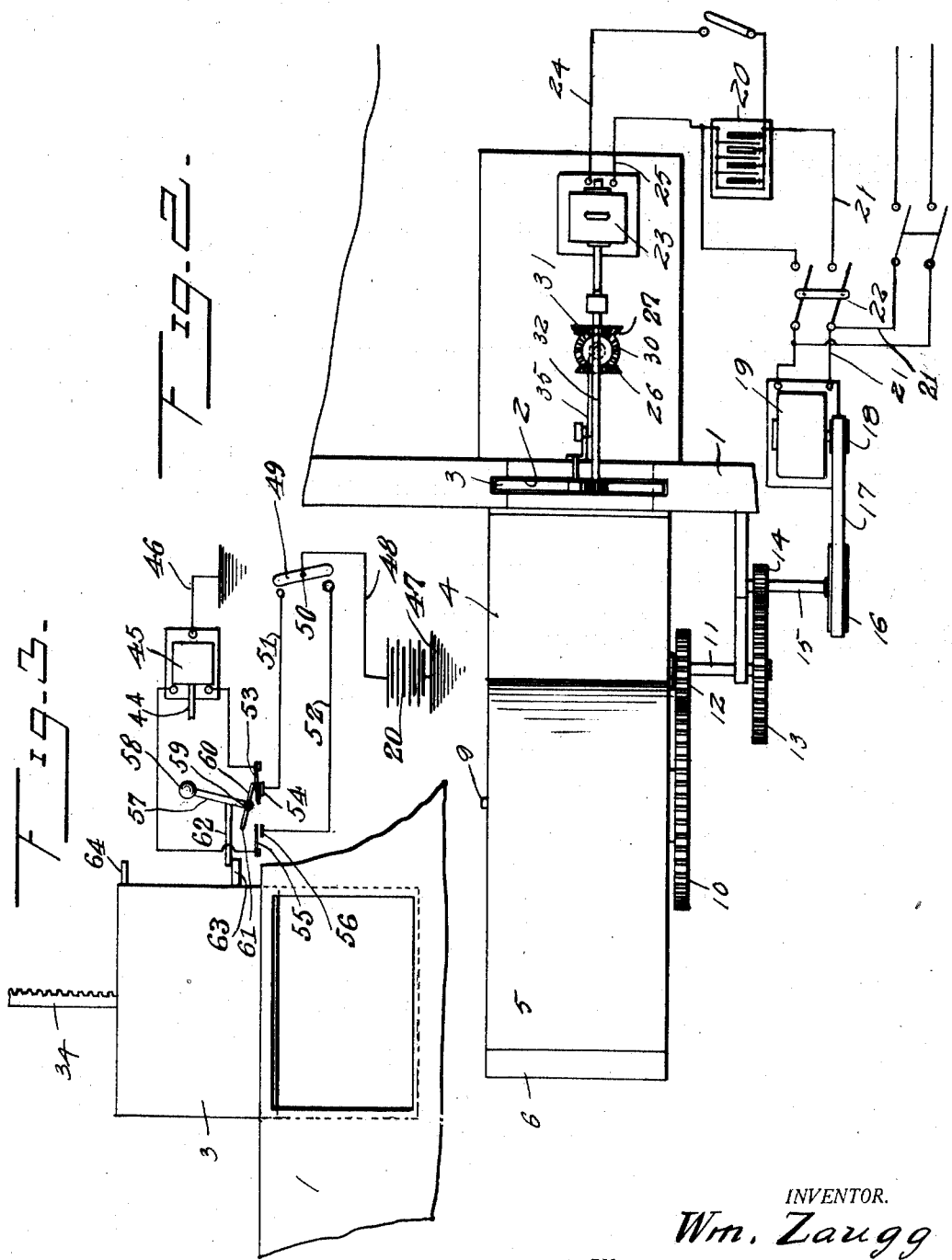

UNITED STATES PATENT OFFICE.

WILLIAM ZAUGG, OF CHATTANOOGA, TENNESSEE.

GATE-OPERATING MECHANISM FOR WATER-WHEELS.

1,388,686.  Specification of Letters Patent.  Patented Aug. 23, 1921.

Application filed April 16, 1920. Serial No. 374,375.

*To all whom it may concern:*

Be it known that I, WILLIAM ZAUGG, a citizen of the United States, residing at Chattanooga, in the county of Hamilton and State of Tennessee, have invented certain new and useful Improvements in Gate-Operating Mechanism for Water-Wheels; and I do hereby declare the following to be a full, clear, and exact description of the invention, such as will enable others skilled in the art to which it appertains to make and use the same.

This invention relates to hydro-electric generators adapted to be used for generating an electric current for use for lighting and operating small electric machines and it consists in the novel features hereinafter described and claimed.

An object of the invention is to provide a novel means to open and close the water gate which is used to effect the starting and stopping of the water wheel forming the prime mover in the plant and system.

With this object in view the invention includes in combination with a source of water supply an inclosed wheel having blades upon the periphery thereof and means for directing the water from the source of the supply upon the blades in a manner to utilize the pressure as well as the weight thereof.

The water wheel is operatively connected with an electric generator which in turn is electrically connected with a storage battery. A water gate is provided for controlling the supply of water to the casing of the water wheel and a motor is operatively connected with the water gate and the said motor is connected in open circuit with the battery. Means are provided for closing the circuit between the battery and the motor to effect opening or closing of the water gate as desired.

In the drawings:

Figure 1 is a side elevation of the generator.

Fig. 2 is a top plan view of the same, and

Fig. 3 is a front elevation of the gate and a fragment of the mounting wall together with a diagrammatic view of a modified means for opening and closing the gate.

A gate frame 2 is mounted at the top of the dam and a gate 3 is arranged to move vertically in the gate frame 2. A flume 4 is connected at its upper end with the gate frame 2 and extends down with its lower portion parallel with the face of the dam and disposed vertically. The lower end of the flume 4 connects with the upper portion of a cylindrical casing 5 at one side of the center thereof. The casing 5 is provided at its lower sides with an outlet flume 6 which is disposed tangentially with relation to the casing. A wheel 7 is journaled in casing 5 and is provided with peripheral blades 8 preferably V-shaped as shown in Fig. 1. The wheel 7 is mounted upon a shaft 9 which is journaled for rotation and a gear wheel 10 is mounted upon said shaft 9. A counter shaft 11 is journaled for rotation and carries at one end a relatively small gear wheel 12 which meshes with the gear wheel 10. A relatively large gear wheel 13 is mounted upon the counter shaft and meshes with a relatively small gear wheel 14 mounted upon a shaft 15. A belt pulley 16 is carried by the shaft 15 and a belt 17 is trained around the pulley 16 and around a pulley 18 mounted upon the shaft of the generator 19. Storage batteries 20 are located at any suitable or convenient point and are electrically connected with the generator 19 by means of wires 21 which serve as conductors and which are provided with a suitable switch 22. If the current from the generator is desired for other purposes, as for lighting, such current is fed by wires 21'.

A motor 23 is located at a convenient point and a wire 24 connects with one pole of the battery and a wire 25 connects with the other. Gear wheels 26 and 27 are mounted upon the shaft of the motor 23. Gear wheel 28 meshes selectively with gear wheels 26 and 27 and is keyed to a flexible shaft 29 which also carries a gear wheel 30. Gear wheel 30 meshes with a gear wheel 31 which is mounted on shaft 32. A gear wheel 33 is keyed to the shaft 32 and meshes with a rack bar 34 which is attached to the gate 3.

A means is provided to flex shaft 29 in order to shift the gear 28 from engagement with one of the gears 26 and 27 to the other. To this end a collar 35 is swiveled on shaft 29. A post 36 has a lever 37 pivoted thereto intermediate its ends as at 38, which lever is weighted at 39. A link 40 is pivoted to lever 37 and to the collar 35. An arm 41 rigid with lever 37 projects therefrom into the path of movement of and between pins or lugs 42 and 43 projecting from gate 3, preferably the bar 34 thereof.

When the gate 3 is in an open position as in Fig. 1, the water flows through the frame, the flume 4 and upon the blades 8, thus rotating the wheel 7, and therefrom the generator 19, through the intermediate gearing from gear 10 to gear 18. Current from the generator 19 may be led through conductors 21 to the battery 20 to recharge it or through said wires 21 and wires 21' for lighting or other purposes. Should it be desired to lower the gate 3, current is used from the battery 20, through wires 24 and 25 to drive motor 23. The motor shaft turns gear 26, gear 28 in mesh therewith, shaft 29, gears 30 and 31, shaft 32, gear 33 and rack 34, causing the gate and rack to lower. When the gate approaches closed position, lug 43 strikes lug 41, depressing the same and tilting lever 37 so that gear 28 will be shifted into engagement with gear 27 at which moment the operation of motor 23 is manually stopped. Weight 39 maintains the lever 37 in the position to which it is shifted. If it should be desired to raise the gate, motor 23 is started so that through the meshing of gears 27 and 28 the parts described will move in the opposite direction with pin 42 adapted to engage pin 41 to effect shifting of the gear 28 as the gate reaches a raised position.

In Fig. 3 a modified form of mechanism for shifting the gate 3 is employed, the gate being driven by the same gearing as in the other figures, coöperating with rack 34 and the shaft 44 of a reversible motor 45 supplanting motor 23. Motor 45 is grounded at 46. Battery 20 is grounded at 47, while a conductor 48 leads from its other pole to a switch arm 49, pivoted at 50 for movement to engage contacts of either a conductor 51 or a conductor 52, both leading to motor 45. In wire 51 normally separated contacts 53 and 54 are provided and in wire 52 similar normally separated contacts 55 and 56 are provided. A circuit closer or controller 57 coöperates with said contacts, being weighted at its top at 58. Member 57 is pivoted at 59 and has lateral lugs 60 and 61. It also has a lateral arm 62 extending into the path of movement of and between pins 63 and 64 extending from the gate. The gate being raised as in Fig. 3, closer 57 is tilted so as to engage contact 53 and depress it into engagement with contact 54. To lower the gate, switch 49 is moved into engagement with wire 51 so that the motor will rotate in one direction to operate the gearing to lower the gate. When lowered position is approached the lug 64 strikes lug 62. This engagement of lugs 62 and 64 tilts the controller 57 so that arm 61 closes contacts 55 and 56. When it is desired to raise the gate thereafter, switch 49 is thrown into contact with conductor 52 to operate the motor in a direction reverse to that described.

Changes within the spirit and scope of the invention may be resorted to.

Having thus described the invention, what is claimed is:—

1. In a gate operating mechanism for the purpose described, means operable to move the gate in opposite directions, and control means operable through movement of the gate to determine the direction of movement of the first means.

2. In a gate operating mechanism for the purpose described, a shifting means, abutment means on the gate engageable therewith, operating mechanism for the gate, and said shifting means being associated with the operating mechanism to vary the direction of movement thereof.

3. In a gate operating mechanism for the purpose described, a shifting means, abutment means on the gate engageable therewith, operating mechanism for the gate, and said shifting means being associated with the operating mechanism to vary the direction of movement thereof, said shifting means being a lever, and a weight thereon to maintain the lever in shifted positions.

In testimony whereof I affix my signature in presence of two witnesses.

WILLIAM ZAUGG.

Witnesses:
  Jos. H. Fischer,
  F. S. Severeis.